United States Patent [19]

Boberski et al.

[11] 4,304,693
[45] Dec. 8, 1981

[54] SEMISOLID WATER-BASED COATING COMPOSITIONS

[75] Inventors: William G. Boberski, Gibsonia; James E. Jones, Lower Burrell; Rodger G. Temple, Gibsonia, all of Pa.

[73] Assignee: PPG Industries, Inc., Pittsburgh, Pa.

[21] Appl. No.: 132,918

[22] Filed: Mar. 24, 1980

[51] Int. Cl.³ .................................................. C08L 1/28
[52] U.S. Cl. ........................... 260/17 R; 260/29.6 PT; 260/29.6 RW; 260/29.6 TA
[58] Field of Search ...................... 260/17 R

[56] References Cited

U.S. PATENT DOCUMENTS

| Re. 28,957 | 9/1976 | Drelich | 427/331 |
| 3,280,050 | 10/1966 | Johnson et al. | 260/17 |
| 3,810,784 | 5/1974 | Wong et al. | 427/DIG. 5 |
| 3,928,676 | 12/1975 | Drelich | 427/341 |
| 3,993,510 | 11/1976 | Bellavin | 427/DIG. 5 |
| 4,097,430 | 6/1978 | Phillips | 260/17.4 ST |
| 4,196,107 | 4/1980 | Jones et al. | 260/29.6 RW |

FOREIGN PATENT DOCUMENTS

| 833583 | 4/1960 | United Kingdom . |
| 1029723 | 5/1966 | United Kingdom . |
| 1068715 | 5/1967 | United Kingdom . |
| 1413126 | 11/1975 | United Kingdom . |
| 1430866 | 4/1976 | United Kingdom . |

OTHER PUBLICATIONS

Chem. Abstracts, 71, 113692m.
Chem. Abstracts, 82, 126754k.
Chem. Abstracts, 74, 91642c.
Chem. Abstracts, 74, 91646g.
Chem. Abstracts, 71, 102518h.

*Primary Examiner*—V. P. Hoke
*Attorney, Agent, or Firm*—Thomas M. Breininger; George D. Morris

[57] ABSTRACT

This invention relates to coating compositions which are "solid" prior to application, yet, which when applied to a substrate, flow and level in a manner similar to conventional coating compositions. The coating compositions of the invention comprise a gelled coating composition, capable of application and flow on a solid substrate comprising: (a) a water reducible polymer, (b) water, (c) an electrolyte, (d) a colloidal gelling agent, gelable by interaction with the electrolyte, in an amount sufficient, when interacted with said electrolyte, to gel the composition to form a stable semisolid and to provide a composition reducible to a coating application viscosity upon the application of a relatively small shearing force at a relatively small shearing rate; which gelled coating composition, after being sheared to a coating application viscosity, does not recover substantial colloidal gelling agent contributed gel structure and (e) an amount of a gel structure formation rate increasing compound which corresponds, or is hydrolyzable in situ to effectively provide a compound which corresponds to the formula:

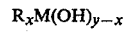

$$R_xM(OH)_{y-x}$$

where M is selected from boron, aluminum, silicon, tin, titanium, zirconium, vanadium, niobium, hafnium, and tatalum; x is 0 or 1; y is the valence of M; and R is an organic moiety attached to M through a carbon-M bond; condensate thereof; or a combination thereof; said amount being an amount sufficient to decrease the time required to form said gelled composition.

16 Claims, No Drawings

SEMISOLID WATER-BASED COATING COMPOSITIONS

BACKGROUND OF THE INVENTION

One major criticism of conventional coating compositions is the mess attendant in their handling and application. First, typically, the coating composition must be stirred to redisperse the solids content, and then at least a portion of the coating composition is transferred to a pan adapted to a roller or pad applicator. Splashing, dripping or spilling, prior to and during the actual application of the coating composition to a substrate are always real dangers.

Prior attempts have been made in the art to provide "solid" coating compositions which could be applied in stick form either by manual or machine assisted application, the application shearing force fluidizing the coating composition. However, even in the best of these systems, the gelled, solid or semisolid composition was provided by the use of thixotropic agents, and, while shearing forces could temporarily provide a fluidized system, once the shearing force was removed, the thixotropic agents present once more began to restore the solid nature or gel structure to the system, thus hampering desirable flow and leveling of the applied coating compositions.

In addition, the use of a stick form product entails holding a heavy object up to the application point and increases arm weariness.

Contrary to the prior art systems, in the coating compositions of the invention, once the gel structure formed by the interaction of an electrolyte and a colloidal gelling agent is destroyed by the application of shearing forces, there is little or no recovery of a substantial gel structure contributed by the gelling system. Thus, the compositions of the invention act as conventional paints when coated upon a substrate, providing excellent flow and leveling.

In commonly assigned copending application Ser. No. 912,807, filed June 6, 1978, by James E. Jones et al, now U.S. Pat. No. 4,196,107 there is disclosed compositions identical to the compositions of the invention, but for the presence of the semisolid composition formation rate enhancing compound. These previously disclosed semisolid compositions have excellent application and coating characteristics. However, as stated in said previous application, since the interaction of the colloid and electrolyte frequently requires a substantial period of time at room temperature, in order to obtain a gel structure which is stable within convenient commercial plant production parameters, it is frequently desirable to accelerate the substantially complete interaction between the electrolyte and colloid by the application of heat, for a time sufficient to substantially complete the colloid-electrolyte interaction. As this heating step is most conveniently done after individual market containers have been filled, the mass production of such a product would require substantial unusual additions to a conventional coatings packaging system. The present invention eliminates or reduces the need for such a heat treatment step without substantially altering the other desirable characteristics of the prior disclosed compositions. The present invention also facilitates pre-use (e.g. in retail stores) tinting which could not readily be performed with the heat treated composition.

SUMMARY OF THE INVENTION

This invention relates to coating compositions which are "solid" prior to application, yet, which when applied to a substrate, flow and level in a manner similar to conventional coating compositions. The coating compositions of the invention comprise a gelled coating composition, capable of application and flow on a solid substrate comprising: (a) a water reducible polymer, (b) water, (c) an electrolyte, (d) a colloidal gelling agent, gelable by interaction with the electrolyte, in an amount sufficient, when interacted with said electrolyte, to gel the composition to form a stable semisolid and to provide a composition reducible to a coating application viscosity upon the application or a relatively small shearing force at a relatively small shearing rate; which gelled coating composition, after being sheared to a coating application viscosity, does not recover substantial colloidal gelling agent contributed gel structure and (e) an amount of a gel structure formation rate increasing compound which corresponds, or is hydrolyzable in situ to effectively provide a compound which corresponds to the formula:

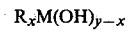

$$R_xM(OH)_{y-x}$$

where M is selected from boron, aluminum, silicon, tin, titanium, zirconium, vanadium, niobium, hafnium, and tantalum; x is 0 or 1; y is the valence of M; and R is an organic moiety attached to M through a carbon-M bond; condensate thereof; or a combination thereof; said amount being an amount sufficient to decrease the time required to form said gelled composition.

Compositions comprising (a), (b), (c) and (d) which can be employed in conjunction with (e) above are disclosed in copending application Ser. No. 912,807, filed June 6, 1978, by James E. Jones et al, now U.S. Pat. No. 4,196,107 which application in its entirety is hereby incorporated by reference.

DESCRIPTION OF THE INVENTION

The above summarized invention is described in more detail as follows:

Generally, the coating compositions of the invention are conventional water-based coating compositions containing, in addition to their conventional components, appropriate amounts of a gel forming system which is a combination of an electrolyte, colloidal gelling agent, gelable by interaction with said electrolyte and the gel formation rate enhancing compound. The conventional water-based coating compositions employed may be virtually any of the available compositions containing conventional materials, in their conventional proportions, such as, for example, water reducible film forming resins, solubilizers and/or emulsifiers, varying amounts of organic solvents and co-solvent, pigments, extenders, fillers, wetting agents, viscosity control agents, flow control agents, and the like.

It is noted that, to the extent that certain water reduced resins and/or other conventional ingredients are electrolytes, the presence of such materials may satisfy the dual functions of a conventional coating composition ingredient, e.g. a film former, and an electrolyte in the gel forming system.

The water reducible film forming polymers useful in the compositions of this invention include all such polymers known useful in such compositions to form a water-borne polymer system, for example, a solution, dispersion or emulsion.

The film forming polymer includes, but is not limited to, water-reducible inorganic and organic polymers, such as acrylic polymers, vinyl resins and chlorine substituted vinyl resins, polyphosphorylonitriles, polyethers, saturated and unsaturated polyesters, polyurethanes and polyepoxides as well as, natural resins or chemically modified natural resins. The resins which are addition polymers can be homopolymers or copolymers. The resins which are condensation polymers can be formed from any number of condensable reactants. Appropriate functional groups can be built into the polymer chain or grafted thereto. A mixture of more than one film forming polymer can be employed. The polymer employed may provide thermoplastic or thermosetting systems, curable, for example, by chemical means or radiation, at ambient or elevated temperatures.

It is noted that "film forming" is defined as the ability to form a film in the existing system, which may include solvents, co-solvents and/or plasticizers. Thus, polymers which are not inherently film forming without, for example, coalescing solvents and/or co-solvents are included within the scope of the film forming polymers which can be employed in the invention. Again, this represents conventional coatings technology.

The polymer is generally present in an amount conventionally used in coating compositions.

While not essential, the composition may contain one or more pigments, such as hiding pigments, extender pigments or coloring pigments. Examples of useful pigments include titanium dioxide, antimony oxide, zinc oxide, zirconium oxide, zinc sulfide and lithopone. Extender pigments include silica, barytes, calcium carbonate, talc, magnesium silicate and aluminum silicate.

In general, the pigment is used in an amount of 0 to 70 percent by weight of the total composition. The pigment can be present to provide pigment volume concentrations up to about 75 (i.e. 75% of the final dry film volume being pigment).

The electrolyte gelable colloid employed in the compositions of the invention can be virtually any coating composition compatible colloid which can be gelled by a paint compatible electrolyte. Typically, these colloids are aqueous dispersions of non-agglomerated millimicron sized particles having a surface charge and which are stabilized by a counter-ion. Such colloids may be anionic or cationic in nature.

A particularly useful group of colloids are colloidal silicas, usually with high $SiO_2/Na_2O$ ratios, where the particle surface is partially composed of silanol groups which are partially ionized and stabilized in the presence of sodium counter ions. Similar colloids are useful where the counter ion is, for example, potassium, lithium, ammonium, substituted ammonium and quaternary ammonium ions. Examples of such colloids are available under the tradenames Ludox, Nalcoag and Nyacol.

A number of useful aqueous colloidal silica sols are set forth in Table 1.

TABLE 1

| | 1 | 2 | 3 | 4 | 5 | 6[4] | 7 | 8 |
|---|---|---|---|---|---|---|---|---|
| Stabilizing Counter-Ion | Na | Na | Na | Na | Na | Na | Ammonium | Na |
| Particle Charge | Negative | Negative | Negative | Negative | Negative | Negative | Negative | Negative |
| Particle Size, nm. | 13–14 | 13–14 | 14–15 | 7–8 | 21–24 | 13–14 | 13–14 | 4 |
| Specific Surface Area SqM/g. | 210–230 | 210–230 | 195–215 | 375–420 | 125–140 | 210–230 | 210–230 | 750 |
| Silica (as $SiO_2$), wt.% | 40 | 30 | 30 | 30 | 49.5 | 30 | 30 | 15 |
| pH | 9.7[1] | 9.8[1] | 8.4[1] | 9.9[1] | 8.9[1] | 9.0[1] | 9.6[1] | 10.4–10.7 |
| Titratable alkali (as $Na_2O$), wt.% | 0.43 | 0.32 | 0.10 | 0.60 | 0.21 | 0.19 | 0.09[5] | 0.80 |
| $SiO_2/Na_2O$ (by wt.) | 90 | 90 | 300 | 50 | 230 | 160 | 120[6] | 19 |
| Viscosity (cps) | 17.5[2] | 4.5[2] | 14[2] | 5.5[2] | 50[2] | 17[2] | 20[2] | 18 |
| wt./gal (lbs.) | 10.8[1] | 10.1[1] | 10.1[1] | 10.1[1] | 11.6[1] | 10.1[1] | 10.1[1] | 9.2[1] |
| Sp. Gravity | 1.30[1] | 1.21[1] | 1.21[1] | 1.21[1] | 1.39[1] | 1.21[1] | 1.21[1] | 1.104[1] |
| Conductance (Micromhos) | 4730[3] | — | 1570[3] | 4730[3] | — | 2270[3] | 2630[3] | — |

| | 9 | 10 | 11 | 12 | 13 | 14 | 15 | 16 |
|---|---|---|---|---|---|---|---|---|
| Stabilizing Counter-Ion | Ammonium | Na | Na | Na | Na | Na | Ammonium | Na |
| Particle Charge | Negative | Negative | Negative | Negative | Negative | Negative | Negative | Negative |
| Particle Size, nm. | 5 | 8 | 15 | 13 | 20 | 60 | 20 | 8 |
| Specific Surface Area SqM/g. | 600 | 375 | 200 | 190–270 | 120–176 | 40–60 | 150 | — |
| Silica (as $SiO_2$), wt.% | 14.5 | 30 | 40 | 30 | 50 | 50 | 40 | 30 |
| pH | 9.0 | 10.0 | 9.7 | 10.2 | 9.0 | 8.5 | 9.3 | 10.7[1] |
| Titratable alkali (as $Na_2O$), wt.% | 0.01[7] | 0.65 | 0.40 | 0.40 | 0.35 | 0.25 | <0.1[9] | 0.45 |
| $SiO_2Na_2O$ (by wt.) | 48[6] | 46 | 100 | 75 | 143 | 200 | 200[6] | 67 |
| Viscosity (cps) | 5 | 6 | 12 | 5 | 40 | 10 | 20 | 6 |
| wt./gal (lbs.) | 9.1 | 10.1 | 10.8 | 10.1 | 11.6 | 11.6 | 10.8 | 10 |
| Sp. Gravity | 1.092[8] | 1.214 | 1.296[8] | 1.208[8] | 1.390[8] | 1.390[8] | 1.292[8] | 1.22 |

| | 17 | 18 | 19 | 20 | 21 | 22 |
|---|---|---|---|---|---|---|
| Stabilizing Counter-Ion | Na | Na | Na | Na | Na | — |
| Particle Charge | Negative | Negative | Negative | Negative | Negative | — |
| Particle Size, nm. | 3–4 | 14 | 14 | 22 | 22 | 16–22 |
| Specific Surface Area SqM/g. | — | — | — | — | — | 135–190 |
| Silica (as $SiO_2$), wt.% | 15 | 30 | 40 | 50 | 40 | 34 |
| pH | 11 | 10.4 | 10.4 | 10 | 10 | 3.1 |
| Titratable alkali (as $Na_2O$), wt.% | 0.75 | 0.35 | 0.48 | 0.48 | — | <0.05 |
| $SiO_2/Na_2O$ (by wt.) | 20 | 86 | 83 | 104 | — | — |
| Viscosity (cps) | 5 | 6 | 16 | 50 | 10 | <20 |
| wt./gal (lbs.) | 9.2 | 10 | 10.9 | 11.5 | 10.8 | 10.2 |

TABLE 1-continued

| Sp. Gravity | 1.1 | 1.21 | 1.30 | 1.4 | 1.30 | 1.230[8] |
|---|---|---|---|---|---|---|

[1]@25° C., 77° F.
[2]@25° C., 77° F. Ostawald-Fenske pipette No. 100 or 200, depending on Visc. Range
[3]@20° C., 69° F.
[4]Surface modified with aluminate ions
[5]Sol contains 0.25% $NH_3$ and 0.09% $Na_2O$
[6]$SiO_2/NH_3$ (by wt.)
[7]Sol contains 0.30% $NH_3$ and 0.01% $Na_2O$
[8]@20° C., 68° F.
[9]Sol contains 0.2% $NH_3$ and <0.1 $Na_2O$ An example of a cationic colloidal silica is one where some of the surface atoms are aluminum atoms. This allows for creation of a fixed positive charge. One such aqueous colloidal silica, stabilized by chloride ions, is most stable in the range of pH 3.5 to 5.5. This aqueous colloidal silica, comprises 26% silica and 4% alumina, and is characterized as:

| | |
|---|---|
| Stabilizing counter ion | Chloride |
| Particle Charge | Positive |
| Particle Size, nm | 13–15 |
| Specific surface area, sq. m/g | 200–220 |
| Silica (as $SiO_2$), wt.%/alumina wt.% | 26/4 |
| pH (25° C., 77° F.) | 4.4 |
| Chlorides (as NaCl), wt.% | 1.4 |
| Viscosity (25° C., 77° F.), cps | 5.15 |
| Weight per gallon (25° C., 77° F.), lb. | 10.2 |
| Specific Gravity (25° C., 77° F.) | 1.23 |

In addition to silica sols, other sols which are electrolyte gelable include $As_2S_3$ sols, $Fe_2O_3$ sols, $Al_2O_3$ sols, AgI sols, $Sb_2O_3$ sols and the like.

An example of a useful colloidal alumina (Baymal) is a free flowing powder consisting of clusters of minute fibrils of boehmite (AlOOH) alumina. The powder disperses in water to yield sols of the ultimate fibrils. The surface of the fibrils is modified by absorbed acetate ions. The powder has the following typical composition:

| | Percent |
|---|---|
| AlOOH | 83.1 |
| $CH_3OOH$ | 9.8 |
| $SO_4$ | 1.7 |
| Water | 5.0 |
| $NH_4$ | 0.2 |
| Na | 0.07 |
| Fe | 0.02 |
| $SiO_2$ | 0.02 | and the following typical physical properties:

| | |
|---|---|
| Specific surface area | 274 sq. m/g |
| Pore volume | 0.53 c.c./g. |
| Pore diameter | 77 Angstroms |
| Bulk density | |
| - loose | 26 lbs/ft$^3$ |
| - packed | 31 lbs/ft$^3$ |
| Absolute density (fibril) | 2.28 g./c.c. |
| Refractive index (fibril) | 1.580 $n_{25}^D$ |
| Oil absorption | 147 (ASTM D-281-31) |
| Color | White |
| pH-4% sol | 3.8 (KCl bridge/calomel cell |
| | 4.3 (no bridge) |
| Particle charge in sol | Positive |

Attention is drawn to "Colloid Chemistry", A. Sheludko, First English Edition, Elsevier Publishing Company, Amsterdam 1966, and particularly Chapter VII thereof, entitled "Stability of Lyophobic Sols", wherein there is discussed inter alia coagulation of colloids by electrolytes and the kinetics of fast coagulation, and wherein there are given numerous examples of colloidal sols and electrolytes which cause gelation.

Examples of electrolytes which can be employed in the gel forming system of the invention are electrolytes which are capable of causing "fast gelation" (see Sheludko, supra) of the particular colloid sol employed. The electrolyte is a salt, dissociable in water, which can be an inorganic, organic or mixed salt. The salt can be a monofunctional or polyfunctional salt, or even a polymeric salt. Typical functional electrolytes are salts such as, for example, alkali metal tripolyphosphoric acid salts and alkali metal salts of ethylenediamine tetraacetic acid. Polymeric salts such as sodium carboxymethyl hydroxyethyl cellulose and alkali metal salts of styrene-maleic anhydride copolymers are useful electrolytes. Numerous other electrolytes are exemplified by Sheludko, supra and are thereof not repeated here. Still other electrolytes which can be used to gel anionic colloidal silica sols include ethylenediamine tetraacetic acid, its mono, its di, tri, and tetra sodium salts, and its di(triethylamine) salt as well as potassium tripolyphosphate, disodium phosphate, polyphosphoric ester acid anhydride potassium salt, sodium polyacrylic acid, carboxyl ion exchange resins in their acid or neutral form, sulfonic acid ion exchange resins in their acid or neutral form, diethylene triamine, sodium chloride and hydrochloric acid.

Although we do not desire to be bound by any theory, it is believed that the addition of the additive of this invention results in destabilization of the colloid resulting in more rapid gelation.

The colloid and electrolyte are employed in an amount sufficient with respect to each other and to the total system so that upon substantially complete interaction between the colloid and electrolyte there is formed a substantially stable gelled system which is solidified to a solid or semisolid state yet which can be reduced by the application of a relatively small shearing force at a relatively small shearing rate, for example, as provided by a person using a painting implement, for example, a pad applicator, to an acceptable ordinary painting viscosity.

Since pigment particles, as well as polymeric particles (e.g. latex particles) are commonly dispersed particles carrying a charge, they are capable of interaction with electrolyte and colloidal gelling species. These interactions may influence the gelling mechanism. The amount of gelling agent and/or electrolyte may require adjustment to compensate for the presence of such an interacting material.

In addition to the above described necessary or optional components the compositions of the invention contain an amount of a gel structure formation rate increasing compound which corresponds, or is hydrolyzable in situ to effectively provide a compound which corresponds to the formula:

$$R_xM(OH)_{y-x} \quad (I)$$

where M is selected from boron, aluminum, silicon, tin, titanium, zirconium, vanadium, niobium, hafnium or tantalum, preferably boron, aluminum, silicon, titanium or zirconium; x is 0 to 1; y is the valence of M; and R is an organic moiety attached to M through a carbon-M bond; condensates thereof, including condensates corresponding to the empirical formula:

$$\left(R_xMO_{\frac{x-y}{2}}\right) \quad (II)$$

where R, M, x and y are as defined above, as well as partial condensates of (I) [which inherently have a formula which can be described as being between formulas (I) and (II)]; said amount being an amount sufficient to decrease the time required to form said gelled composition. The group R preferably has less than 20 carbon atoms and more preferably less than about 10 carbon atoms.

The preferred compounds are silicon compounds, preferably organo-silicon compounds which have at least three hydroxyl groups or hydrolyzable groups attached to the silicon atom which may be selected from the group consisting of halogen, alkoxyl, substituted alkoxyl, aryloxyl, substituted aryloxy, aralkoxyl, substituted aralkoxyl, alkylamino, substituted alkylamino, silylamino, substituted silylamino, mercapto and substituted mercapto groups.

Suitable halogen substituents include chloro, bromo and iodo. Examples of suitable alkoxy groups include methoxy, ethoxy, propoxy, acetoxy and the like. Suitable substituted alkoxyl groups include chloro, bromo and iodo substituted alkoxyl groups, where the alkoxyl moiety is of the aforementioned groups. Examples of suitable aryloxy, aralkoxy, substituted aryloxy and substituted aralkoxy groups are, respectively, phenoxy, phenylethoxy, chlorophenylethoxy and phenylchloroethoxy groups. Suitable alkylamino and substituted alkylamino groups are, respectively, methylamino or dimethylamino and chloromethylamino. Examples of mercapto and substituted mercapto groups include, respectively, ethyl mercapto and chloroethyl mercapto groups. Silylamino and substituted silylamino groups include these secondary and tertiary amine groups having a silicon atom bonded to the amino nitrogen.

A particularly preferred group of organo-silicon compounds corresponds to the formula:

$$R_nSi(OR')_{4-n}$$

where n is 0 or 1, where (OR') is —OH or a group hydrolyzable to —OH, for example an aliphatic hydrocarbon group having 10 or less and preferably 6 or less carbon atoms including methyl, ethyl, propyl, isopropyl hexyl, 2-ethylhexyl, vinyl, 5-hexenyl and the like as well as phenyl and lower alkyl phenyl groups and the like, and R is aliphatic hydrocarbon group or ester, ether, amino or amido linkage containing hydrocarbyl group preferably containing ten or less carbon atoms, or phenyl group, or preferably an amino aliphatic hydrocarbon group containing less than ten carbon atoms.

Among others, gamma-aminopropyltriethoxysilane is an example of a preferred compound. Generally, where R' is other than hydrogen at least one amino substituted R group is preferably present on the compound to provide an internal hydrolysis catalyzing effect.

Alternatively, compounds which can be employed include compounds corresponding to the formulas:

$$Al(A)_3, Ti(A)_4, Zr(A)_4, \text{ or } B(A)_3$$

and the like, where A is —OH or an atom or organic group hydrolyzable to form an —OH moiety. Examples of compounds which can be employed include aluminum isopropoxide, triethylborate, zirconium butoxide, titanium isopropoxide and the like, as well as niobium ethoxide, vanadyl ethylate, tantalum ethoxide, hafnium propoxide, tin ethoxide and the like.

As used herein, an amount in (e) sufficient to decrease the time required to form the gelled composition is that amount of such compound and/or condensate which measureably reduces the time required to form a stable gelled semisolid or solid coating composition reducible to a coating application viscosity upon the application of a relatively small shearing force at a relatively small shearing rate, which gelled composition, after being sheared to a coating application viscosity, does not recover substantial colloidal gelling agent-electrolyte contributed gel structure; that amount being less than an amount which produces an unstable and/or non-shearing force reducible gel.

For convenience, these compounds are sometimes hereinafter referred to as "gel state promoters".

In some instances, if desired, especially where the composition does not have a high pH and the gel state promoter contains groups which are hydrolyzable, the addition of bases such as ammonia or amines may be employed to catalyze the hydrolysis reaction.

The solid coating compositions of the invention can be formulated in a number of ways. If desired, a conventional coating composition can be prepared and the gel forming system then added thereto. Alternatively one, two or all three of the colloid, the electrolyte, and the gel state promoter may be added during the coating composition formation process. In the event, the final coating composition, containing the gel forming system, may be introduced into a container, adapted to provide a surface area compatible with the applicator to be used to transfer the coating composition from the container to the surface to be coated, prior to significant gel formation. Alternatively, the composition may be processed to its gel form as a slab, which is subsequently cut to shape conforming to that of its final container. As it is frequently desirable to use a pad applicator, the container is typically a relatively shallow pan, although other types of containers can be employed. In one preferred form the surface of the container is sealed with a plastic film in contact with the paint surface.

In a preferred embodiment, for example, for trade sales use, the coating formulation can be adapted to provide a package containing the electrolyte and gel state promoter. At time of sale the colloid (and tints and/or colored pigmentation, if desired) can be added to rapidly form the semisolid coating compositions.

While, a previously stated, the coating composition components, other than the gel forming system, are present to perform a conventional coating composition formulation function; in one preferred form, the compositions of the invention can contain minor amounts of a high boiling organic solvent to aid in the prevention or retardation of crack formation in the applied film. Where the solvent selected is water insoluble, and not a true solvent for the binders which are present, the presence of the solvent in the system also serves to increase hiding by the creation of microvoids as taught by Seiner, U.S. Pat. Nos. 3,669,728 and 3,669,729. Since these unique gel forming systems act as an ideal matrix for finely dispersed droplets of solvent, stability of these droplets is enhanced. Over extensive periods of storage, coalescence of solvent droplets can occur in conventional liquid paints. This is precluded where gel entrapment is present. When subjected to a relatively small shearing force at a relatively small hearing rate the coating compositions viscosity reduces to that of a liquid paint. At this point droplet stability would be reduced to that of a liquid paint. Since, however, the duration of this liquified period is short, an appreciable hiding improvement over that taught by Seiner is observed.

Where the use of a pad applicator is contemplated, the coating composition, absent the gel forming system, is designed to have a low value of its high shear viscosity to reduce applicator drag.

The stable "solid" coating compositions formed vary from semi-solids to firm solids all of which are characterized by being self-supporting and resistant to flow in the absence of an applied shearing force. The preferred solid coating compositions are sufficiently solid to display a spike value, as defined hereinafter, of at least about 8. (Typically, the coating compositions display a penetrometer value, as defined hereinafter, of less than about 35 mm).

The coating compositions of the invention are further characterized in that the viscosity contributed by the gel forming system is diminished upon the application of reasonable shear forces, such as those applied by a human with a conventional coating applicator, to the extent that the coating compositions have transfer properties suited to the use of a coating applicator, such as a pad applicator; and then as further shearing forces are applied, during the application of the coating composition, the coating compositions have application properties suited to the use of the applicator. Generally, the coating composition after substantially complete destruction of the colloidal gelling agent—electrolyte contributed gel structure by reasonable shearing forces, such as those applied by a human during transfer and application, has a viscosity at 780 sec$^{-1}$ of between about 2.5 poise and about 10 poise and preferably between about 3 poise and about 7 poise.

While the useful and optimum proportions of the various materials in the compositions of the invention may vary widely, dependent in part on the nature of the specific materials and their interaction with each other, and while to a significant extent the particular proportions of a substantial part of the composition are governed by selection within standard coating composition formulation technology, generally taking the essentially water reducible polymer, the colloid, and the electrolyte as 100 parts by weight, the composition usually comprises between about 25 to about 99 parts, and preferably about 60 to about 95 parts by weight of the water reducible polymer; and about 0.7 to about 60.0, and preferably about 1 to about 20 parts by weight of the colloid; and about 0.1 to about 50 parts and preferably between about 2 to about 20 parts by weight of the electrolyte; with the weight ratio of water to this system generally being at 9:1 to about 1:2.

Gel state promoter is generally present in the composition in an amount between about 1 part and about 100 parts by weight per 100 parts by weight of colloid and preferably in an amount between about 5 parts and about 50 parts by weight per 100 parts by weight of colloid.

While the disclosure addresses the use of a single material to perform a function, in all cases, if desired, that function can be provided by a combination of two or more materials having the same function.

There follow a number of examples which describe the invention. These examples should be considered illustrative rather than limiting. All parts and percentages in the examples, as well as the entire disclosure are by weight unless otherwise specified. All temperatures are degrees Centigrade unless otherwise specified.

In the following examples preliminary evaluations were made using a generally flat pad type applicator with rounded edges to prevent the applicator from digging in and collecting coating composition on and over the applicator edges as it is drawn back and forth across the surface of the semisolid coating composition, with sufficient pressure to cause the surface of the gel to break down and form a coating composition of appropriate transfer viscosity, and subsequent coating viscosity upon application to a substrate.

Also, in some of the examples, the gel strength and coating composition application viscosity were characterized by the use of a rheometer i.e. a Rotovisco RV3 Viscometer from Haake, Inc. using a SVIIP sensing system measured from 0–1000 rpm, using a 50/500 dual measuring head with the Spike being the scale reading at about 15 sec$^{-1}$ shear rate (or about 20 rpm) and the End Point at about 779 sec$^{-1}$ (or about 1000 rpm). (All Rotovisco viscometer values reported are measurements made using the 500 measuring head).

EXAMPLE 1

Solid coating compositions were prepared using conventional formulation and grinding techniques:

| Ingredients | Amounts (Parts by Weight) |
|---|---|
| water | 200.0 |
| associative thickener (30% solids) (TT-678 Rohm & Haas) | 25.0 |
| polyphosphoric ester acid anhydride potassium salt (Strodex SEK-50-Dexter Chemical) (50% solids) | 9.6 |
| sodium salt of a polymeric carboxylic acid (Tamol 731-Rohm & Haas) (25% solids) | 38.2 |
| nonylphenoxypolyethoxy ethanol (Triton N-75 Rohm & Haas) | 6.4 |
| silica and mineral oil defoamer (Defoamer L445-Drew Chemical) | 6.4 |
| phenylmercuric acetate (30% solution) | 1.6 |
| ethylene glycol | 63.7 |
| phenyl ether of ethylene glycol | 25.5 |
| anionic surfactant (VP-535 Henkel International) | 19.1 |

The above ingredients were mixed and there was then added:

| Ingredients | Amounts (Parts by Weight) |
|---|---|
| diatomaceous earth (Celite 499 Johns-Manville) | 67.5 |

-continued

| Ingredients | Amounts (Parts by Weight) |
|---|---|
| calcium modified SiO$_2$ (Hi-Sil 422) | 30.0 |
| barium sulfate | 159.2 |
| The mixture was then dispersed with a Cowles dissolver. There was then added: | |
| hydroxyethyl cellulose | 4.0 |
| aminomethyl propanol | 1.0 |
| high boiling hydrocarbon solvent (Soltrol 200 Phillips Petroleum) | 84.4 |
| premixed with: | |
| nonionic surfactant (TX-45 Rohm & Haas) | 2.4 |
| The resultant mixture was dispersed for five minutes on a Cowles dissolver and let down into a mixture of: | |
| silica and mineral oil defoamer (Defoamer L-475) | 15.9 |
| TiO$_2$ slurry (76% solids) (Titanox 4101 slurry NL Industries) | 1074.3 |
| TiO$_2$ slurry (62% solids) Titanox 4131 slurry NL Industries) | 860.0 |
| water | 475.0 |
| sodium salt of styrene-maleic anhydride copolymer (Arco Chemical SMA-1000A, 100% theoretical neutralization) as 40% solids | 44.6 |
| latex vehicle (Rohm & Haas AC 64) (60.5% solids- solids believed to comprise 43% methyl methacrylate, 55% butyl acrylate, 2% methacrylic acid) | 1076.5 |
| After mixing there was added: | |
| colloidal silica (Table 1 No. 8 supra) | 270.6 |

To three separate 780 part portions of the above compositions various additives were added, and the spike and end point of the composition were measured after 19 hours at room temperature and after that heat treatment at 160° F. for 6 and 16 hours:

TABLE 2

| Com-posi-tion | Additives | Spike/ end point 19 hours at R.T. | 160° F. 6 hrs. | 16 hrs. |
|---|---|---|---|---|
| A | 1.7 parts tetrasodium ethylenediamine tetraacetate (EDTA) and 1.7 parts gamma aminopropyltriethoxysilane | 22.5/ 9.5 | 22.5/ | 24.4/ 10.0 |
| B | .85 parts EDTA .85 parts AT50* | 15.5/ 7.7 | | |
| C | 1.7 parts gamma aminopropyl- triethoxysilane | 19.0/ 9.4 | | 21.2/ 9.0 |
| D | control (no additives) | 15.0/ 8.5 | | 23.0/ 9.6 |

*Tilcom AT50: water soluble chelate based on isopropyl titanate and amino alcohols, 75% in isopropyl alcohol, 8.2% Ti, Titanium Intermediates Limited In addition after the 16 hours at 160° F. samples of A, C and D were stored at 140° F. for two weeks and the spike and end points measures: A 22.0/6.0; C 23.0/7.2; D 23.0/7.2

EXAMPLE 2

To a repeat of the base composition of Example 1, (the formulation through colloidal silica addition) there was additionally 9.9 parts of tetrasodium ethylenediamine tetraacetate and 9.9 parts of gamma aminopropyltriethoxysilane. Portions of the resultant composition were placed in 4 ounce jars and spike and end point determination periodically made. The results are summarized in Table 3.

TABLE 3

| 40Z JARS | HOURS - Room Temperature | | | | |
|---|---|---|---|---|---|
| | 1 | 2 | 4 | 6 | 24 |
| room temperature | 20./* 12.5 | 25.5/ 11.5 | 26.5/ 11.4 | 24.0/ 11.5 | 25.5/ 11.0 |
| 160° F. | 23.0/ 12.5 | 26.0/ 12.5 | 25.3/ 14.0 | | 23.0/ 10-13 |

*spike/ end point

EXAMPLE 3

Two repeat formulation of the base composition of Example 1 were made with the exception that the colloidal silica was not added. The first formulation had an initial viscosity (Brookfied #6 Spindle at 20 rpm) of 8,000 cps; the second formulation had an initial viscosity of 9,500 cps. The first formulation was aged in a 140° F. hot room for 2 weeks. The second formulation was aged at room temperature for two weeks. At that point the first formulation had a viscosity of 10,750 cps, while the second formulation had a viscosity of 10,500 cps.

To each of the aged compositions there was then added 400 parts of colloidal silica (Table 1 #8), 9.9 parts of tetrasodium ethylenediamine tetraacetate and 9.9 parts of gamma aminopropyltriethoxysilane. Rotovisco spike and end points were then determined after 2 and 4 hours at room temperature.

| | 2 hours | | 4 hours | |
|---|---|---|---|---|
| | Spike | end point | Spike | end point |
| first formulation | 21.0 | 9.9 | 22.5 | 10.0 |
| second formulation | 21.0 | 10.0 | 21.5 | 10.4 |

The semisolid paint (4 hours at room temperature) was evaluated for transfer, drag, and drip (drip resistance) by two individuals (0-poor, 10 excellent).

| | transfer | drag | drip |
|---|---|---|---|
| first composition | 9–10 sticky 8–9 | 9 sticky 9 | 10 10 |
| second composition | 10 10 | 9–10 slightly sticky 10 | 10 |

EXAMPLE 4

A repeat of the basic compositions of Example 1, absent the addition of the colloidal silica, was made. To demonstrate that the order of addition of the gelling system components is not critical the following comparisons were made:

To separate half gallon portions of the formulation, the following materials were added and admixed in the order listed:

| 4-A | 4-B | 4-C |
|---|---|---|
| 200 grams colloidal silica (Table 1 #8) | 5.0 grams EDTA | 5.0 grams EDTA |
| 5.0 grams tetrasodium ethylenediamine tetraacetate (EDTA) | 5.0 grams GAPTS | 5.0 grams GAPTS |
| 5.0 grams gamma aminopropyltriethoxy- | 200 grams colloidal silica (Table 1 #8) | |

-continued

| 4-A | 4-B | 4-C |
|-----|-----|-----|
| silane (GAPTS) | | |

Formulation 4-A and 4-B formed a semisolid gel structure within 2–3 minutes. Each addition made had been stirred approximately one minute.

Formulation 4-C was placed in a hot room at 140° F. for two weeks. 200 grams of colloidal silica (Table 1 #8) were added to Formulation 4-C. In each case Rotovisco data were determined on each composition about 2 hours after all additions were complete.

|  | Spike | endpoint |
|---|---|---|
| 4-A | 30.0 | 11.5 |
| 4-B | 29.0 | 11.5 |
| 4-C | 17.0 | 10.0 |
| 4-C (after additional 2 weeks at 140° F.) | 38.5 | 11.0 |

EXAMPLE 5

To demonstrate the gel state promoting effect of various materials the following formulations were made:

TABLE 4

| Ingredients Ex. No. | Parts by Weight | | | | | |
|---|---|---|---|---|---|---|
|  | 5A | 5B | 5C | 5D | 5E | 5F |
| colloidal silica (Table 1 #8) | 160 | 160 | 160 | 160 | 160 | 160 |
| tetrasodium ethylenediaminetetraacetate | 3 | 3 | 3 | 3 | 3 | 3 |
| latex vehicle (AC-490 Rohm & Haas) | 80 | 80 | 80 | 80 | 80 | 80 |
| gamma aminopropyltriethoxysilane | 3 | — | — | — | — | — |
| N-beta(aminoethyl)-gamma-aminopropyltriethoxysilane | — | 3 | — | — | — | — |
| $H_2N(CH_2)_2NH(CH_2)_2NH(CH_2)_3(CH_3O)_3Si$ | — | — | 3 | — | — | — |
| aluminum isopropoxide | — | — | — | 3 | — | — |
| Zircomplex CC (Manchem Ltd.) (aqueous organic ammoniacal zirconium compound 15% Zirconium) | — | — | — | — | — | 3 |
| time to gel (minutes) | 60 | 60 | 60 | 150 | >180 | 39 |

EXAMPLE 6

To further demonstrate the gel state promoting effect of various materials the following formulations were made (Example No. G being a control):

| Ingredients Ex. No. | Parts by weight | | | | | | |
|---|---|---|---|---|---|---|---|
|  | A | B | C | D | E | F | G |
| latex vehicle (AC-33 Rohm & Haas) | 40 | 40 | 40 | 40 | 40 | 40 | 40 |
| colloidal silica (Table 1 #8) | 80 | 80 | 80 | 80 | 80 | 80 | 80 |
| tetrasodium ethylenediaminetetraacetate | 1.5 | 1.5 | 1.5 | 1.5 | 1.5 | 1.5 | 1.5 |
| triethyl borate | 1.5 | | | | | | |
| zirconium n-butoxide | | 1.5 (poor mix) | 1.5 | | | | |
| vanadium ethylate | | | | 1.5 | | | |
| niobium ethoxide | | | | | 1.5 | | |
| gamma aminopropyltriethoxysilane | | | | | | 1.5 | |
| time to gel (hours) | <17 | <20 | <.75 | <5 | <3 | <3 | <20 |

Various other ingredients described hereinabove and varying amounts of the ingredients as set forth hereinabove may be employed in place of the exemplified ingredients to obtain equivalent results. Likewise, the various exemplified procedures may be varied in practice, and in particular can be adapted to the various exemplified semi-solid compositions of copending application Serial No. 912,807 incorporated herein.

The term "stable" is employed throughout the disclosure and claims to describe the semi-solid or solid coating compositions of the invention. The gelling system components are employed so as to obtain the desired spike and end point values upon substantially complete interaction of the celloid and the electrolyte present. Some drift in these values is typical with time, but "stable" as employed herein connotes that, even should these values moderately drift with time, the coating compositions of the invention have a usable commercial shelf life during which the semi-solid or solid can be reduced to acceptable transfer and application viscosities by the application of a relatively small shearing force at a relatively small shearing rate, such as provided by a person employing a painting implement, for example, a pad applicator, to an acceptable ordinary painting viscosity.

Accordingly to the processions of the Patent Statutes, there is described above the invention and what are now considered its best embodiments. However, within the scope of the appended claims, it is to be understood that the invention may be practiced otherwise than as specifically described.

What is claimed is:

1. In a gelled coating composition, capable of application and flow on a solid substrate, comprising:
   (a) a water reducible, film-forming polymer,
   (b) water,
   (c) an electrolyte, and
   (d) a colloidal gelling agent, gelable by interaction with said electrolyte, in an amount sufficient when substantially interacted with said electrolyte, to gel the composition to form a stable semisolid or solid and to provide a composition reducible to a coating application viscosity upon the application of a relatively small shearing force, at a relatively small shearing rate, (e) which gelled coating composition, after being sheared to a coating application viscosity, does not recover substantial colloidal gelling agent-electrolyte contributed gel structure, the improvement which comprises said composition additionally containing an amount of at least one gel structure formation rate increasing compound which corresponds or is hydrolyzable in situ to effectively provide at least one compound which corresponds to the formula:

$$R_xM(OH)_{y-x}$$

where M is selected from boron, aluminum, silicon, tin, titanium, zirconium, vanadium, niobium, hafnium and tantalum; x is 0 or 1; y is the valence of M; and R is an organic moiety attached to M through a carbon-M bond; condensate thereof; or a combination thereof; said amount being an amount sufficient to decrease the time required to form said gelled composition.

2. The composition as in claim 1 where M is boron, silicon, aluminum, titanium or zirconium.

3. In a gelled coating composition capable of application and flow on a solid substrate, comprising:
(a) a water reducible film-forming polymer which is an electrolyte,
(b) water,
(c) a colloidal gelling agent, gelable by interaction with said electrolyte, in an amount sufficient, when substantially interacted with said electrolyte, to gel the composition to form a stable semisolid or solid and to provide a composition reducible to a coating application viscosity upon application of a relatively small shearing force, at a relatively small shearing rate,
(d) which gelled coating composition, after being sheared to a coating application viscosity, does not recover substantial colloidal gelling agent-electrolyte contributed gel structure, the improvement which comprises said composition additionally containing an amount of at least one gel structure formation rate increasing compound which corresponds or is hydrolyzable in situ to effectively provide at least one compound which corresponds to the formula:

$$R_xM(OH)_{y-x}$$

where M is selected from boron, aluminum, silicon, tin, titanium, zirconium, vanadium, niobium, hafnium and tantalum; x is 0 or 1; y is the valence of M; and R is an organic moiety attached to M through a carbon-M bond; condensate thereof; or a combination thereof; said amount being an amount sufficient to decrease the time required to form said gelled composition.

4. The composition as in claim 3 where M is boron, silicon, aluminum, titanium or zirconium.

5. A composition as in claims 1, 2, 3 or 4 wherein the semisolid composition formation rate enhancing compound corresponds to the formula $$R_nSi(OR')_{4-n}$$

where n=0, 1 or 2 where (OR') is —OH or a group hydrolyzable to —OH.

6. In a method of forming a gelled coating composition capable of application and flow on a solid substrate, which coating composition, after being sheared to a coating application viscosity, does not recover substantial colloidal gelling agent-electrolyte contributed gel structure, which method comprises admixing with a preformed water-based coating composition: an electrolyte, and a colloidal gelling agent, gelable by interaction with said electrolyte in an amount sufficient, when substantially interacted with said electrolyte, to gel the composition to form a stable semisolid or solid, and to provide a composition reducible to a coating application viscosity upon the application of a relatively small shearing force, at a relatively small shearing rate, the improvement which comprises adding to the composition, prior to gel formation, an amount of at least one gel structure formation rate increasing compound which corresponds or is hydrolyzable in situ to effectively provide at least one compound which corresponds to the formula:

$$R_xM(OH)_{y-x}$$

where M is selected from boron, aluminum, silicon, tin, titanium, zirconium, vanadium, niobium, hafnium and tantalum; x is 0 or 1; y is the valence of M; and R is an organic moiety attached to M through a carbon-M bond; condensate thereof; or a combination thereof; said amount being an amount sufficient to decrease the time required to form said gelled composition.

7. The method of claim 6 where M is boron, silicon, aluminum, titanium or zirconium.

8. In a method of forming a gelled coating composition capable of application and flow on a solid substrate, which coating composition, after being sheared to a coating application viscosity, does not recover substantial colloidal gelling agent-electrolyte contributed gel structure, which method comprises admixing with a preformed water-based coating composition, containing an electrolyte: a colloidal gelling agent, gelable by interaction with said electrolyte, in an amount sufficient, which substantially interacts with said electrolyte, to gel the composition to form a viscosity stable semisolid or solid, and to provide a composition reducible to a coating application viscosity upon the application of a relatively small shearing force, at a relatively small shearing rate, the improvement which comprises adding to the composition, prior to gel formation, an amount of at least one gel structure formation rate increasing compound which corresponds or is hydrolyzable in situ to effectively provide at least one compound which corresponds to the formula:

$$R_xM(OH)_{y-x}$$

where M is selected from boron, aluminum, silicon, tin, titanium, zirconium, vanadium, niobium, hafnium and tantalum; x is 0 or 1; y is the valence of M; and R is an organic moiety attached to M through a carbon-M bond; condensate thereof; or a combination thereof; said amount being an amount sufficient to decrease the time required to form said gelled composition.

9. The method of claim 8 where M is boron, silicon, aluminum, titanium or zirconium.

10. In a method of forming a gelled coating composition cable of application and flow on a solid substrate, which coating composition, after being sheared to a coating viscosity, does not recover substantial colloidal gelling agent-electrolyte contributed gel structure, which method comprising admixing with a water-based coating composition during the formulation of its ingredients: an electrolyte, and a colloidal gelling agent, gelable by interaction with said electrolyte, in an amount sufficient, when substantially interacts with said electrolyte, to gel the composition to form a stable semi-solid or solid and to provide a composition reducible to a coating application viscosity upon the application of a relatively small shearing force, at a relatively small shearing rate, the improvement which comprises adding to the composition, prior to gel formation, an amount of at least one gel structure formation rate increasing compound which corresponds or is hydrolyzable in situ to effectively provide at least one compound which corresponds to the formula:

$$R_xM(OH)_{y-x}$$

where M is selected from boron, aluminum, silicon, tin, titanium, zirconium, vanadium, niobium, hafnium and tantalum; x is 0 or 1; y is the valence of M; and R is an organic moiety attached to M through a carbon-M bond; condensate thereof; or a combination thereof; said amount being an amount sufficient to decrease the time required to form said gelled composition.

11. The method of claim 10 where M is boron, silicon, aluminum, titanium or zirconium.

12. In a method of forming a gelled coating composition capable of application and flow on a solid substrate, which coating composition, after being sheared to a coating viscosity, does not recover substantial colloidal gelling agent-electrolyte contributed gel structure, which method comprises admixing with a water-based coating composition, comprising a film-forming polymeric electrolyte, during the formulation of its ingredients: a colloidal gelling agent, gelable by interaction with said electrolyte, in an amount sufficient, when substantially interacted with said electrolyte, to gel the composition to form a stable semisolid or solid and to provide a composition reducible to a coating application viscosity upon the application or a relatively small shearing force, at a relatively small shearing rate, the improvement which comprises adding to the composition, prior to gel formation, an amount of at least one gel structure formation rate increasing compound which corresponds or is hydrolyzable in situ to effectively provide at least one compound which corresponds to the formula:

$$R_xM(OH)_{y-x}$$

where M is selected from boron, aluminum, silicon, tin, titanium, zirconium, vanadium, niobium, hafnium and tantalum, x is 0 or 1; y is the valence of M; and R is an organic moiety attached to M through a carbon-M bond; condensate thereof; or a combination thereof; said amount being an amount sufficient to degrease the time required to form said gelled composition.

13. The method of claim 12 where M is boron, silicon, aluminum, titanium or zirconium.

14. The composition as in claims 1, 2, 3 or 4 wherein the semisolid composition formation rate enhancing compound is gamma aminopropyltriethoxysilane.

15. The composition as in claims 1, 2, 3 or 4 wherein the semisolid composition formation rate enhancing compound is ethyl silicate.

16. The method as in claims 6, 7, 8, 9, 10, 11, 12 or 13 wherein the semisolid composition formation rate enhancing compound is selected from the group consisting of gamma aminopropyltriethoxysilane and ethyl silicate.

* * * * *

UNITED STATES PATENT AND TRADEMARK OFFICE
CERTIFICATE OF CORRECTION

PATENT NO. : 4,304,693
DATED : December 8, 1981
INVENTOR(S) : William G. Boberski, James E. Jones, and Rodger G. Temple It is certified that error appears in the above-identified patent and that said Letters Patent are hereby corrected as shown below:

In the Abstract, line 25, "tatalum" should read --tantalum--.

In Claim 10 at column 17, line 4, "cable" should read --capable--.

Signed and Sealed this

Thirtieth Day of March 1982

[SEAL]

Attest:

GERALD J. MOSSINGHOFF
Attesting Officer
Commissioner of Patents and Trademarks